(No Model.)

A. A. JOHNSON.
NUT LOCK.

No. 510,510.  Patented Dec. 12, 1893.

Witnesses
John C. Shaw
N. W. Riley

Inventor
Alexander A. Johnson
By his Attorneys,
C. A. Snow & Co.

ial no. 486,904. (No model.)

UNITED STATES PATENT OFFICE.

ALEXANDER ASBURY JOHNSON, OF CLARKSVILLE, TENNESSEE, ASSIGNOR OF ONE-HALF TO FRANKLIN SUMMERFIELD BEAUMONT, OF SAME PLACE.

NUT-LOCK.

SPECIFICATION forming part of Letters Patent No. 510,510, dated December 12, 1893.

Application filed September 30, 1893. Serial No. 486,904. (No model.)

*To all whom it may concern:*

Be it known that I, ALEXANDER ASBURY JOHNSON, a citizen of the United States, residing at Clarksville, in the county of Montgomery and State of Tennessee, have invented a new and useful Nut-Lock, of which the following is a specification.

The invention relates to improvements in nut locks.

The object of the present invention is to improve the construction of nut locks, and to provide a simple and inexpensive one, which will be positive and reliable in its operation, and which will not weaken a bolt or nut.

The invention consists in the construction and novel combination and arrangement of parts hereinafter fully described, illustrated in the accompanying drawings and pointed out in the claims hereto appended.

Figure 1:
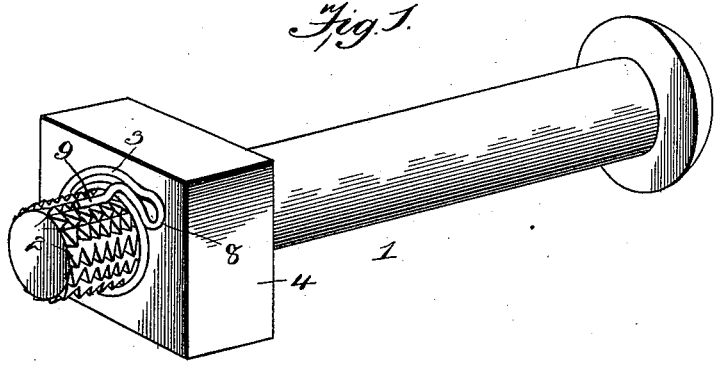
Figure 2:
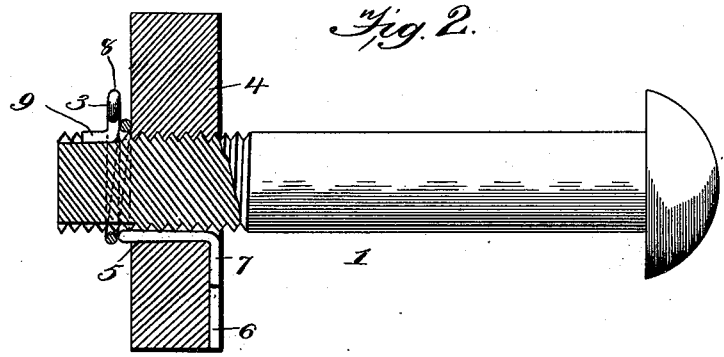
Figure 3:
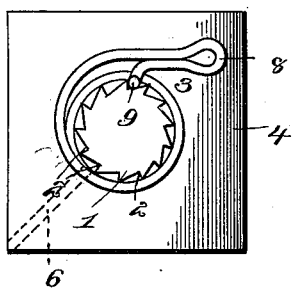
Figure 4:
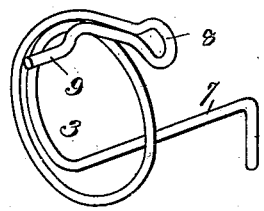

In the drawings—Figure 1 is a perspective view of a nut lock constructed in accordance with this invention. Fig. 2 is a longitudinal sectional view. Fig. 3 is a transverse sectional view. Fig. 4 is a detail perspective view of the locking spring.

Like numerals of reference indicate corresponding parts in all the figures of the drawings.

1 designates a bolt provided at the outer end of its threaded portion with a series of longitudinally disposed grooves 2 shouldered at one side and beveled at the opposite side and forming a ratchet adapted to be engaged by a locking spring 3, which is connected with and carried by a nut 4. The nut is provided adjacent to one of its corners, in order not to weaken its construction, with a groove 5 having a branch 6 extending outward at the inner face of the nut. The grooves 5 and 6 receive an L-shaped shank or stem 7 of the locking spring 3, which is thereby rigidly secured to the nut without interfering with the threads thereof, or with those of the bolt.

The locking spring is spiral, and encircles the bolt at the outer face of the nut, and has the L-shaped stem formed integral with its inner terminus, and its outer end is provided with an integral handle 8, and a projection 9, which is arranged to engage the grooves of the bolt, and which extends outward laterally from the spring. The inner portion of the coiled spring closely hugs the bolt, and the outer portion of the coiled spring is offset slightly from the bolt in order to obtain the necessary resiliency to hold the projection in engagement with the grooves of the bolt.

The construction of the locking spring is such that any tendency of the nut, due to incessant jars and vibrations, to unscrew pulls on the outer portion of the coiled spring and causes the inner portion thereof, which closely hugs the bolt, to engage and squeeze the same, and thereby greatly relieve the outer portion of the coiled spring from strain and preventing any excessive strain from being communicated to the projection. The locking spring is detachably secured to the nut, and may be readily applied thereto previous to screwing the nut on the bolt; and by drawing the handle portion of the coiled spring outward and disengaging the projections from the grooves of the bolt, the nut may be readily unscrewed.

It will be seen that the nut lock is simple and comparatively inexpensive in construction, that the bolt and the nut are not weakened, and that the locking spring is positive and reliable in its operation. It will also be apparent that any slack in the spring may be readily taken up after the nut has been screwed up by moving the projection 9 forward by means of the handle 8.

Changes in the form, proportion and the minor details of construction may be resorted to without departing from the principle or sacrificing any of the advantages of this invention.

What I claim is—

1. In a nut lock, the combination of a bolt provided at the outer end of its curved portion with ratchet grooves, a nut, and a coiled locking spring carried by the nut and encircling the bolt and having its inner portion closely hugging the same and having its outer portion slightly offset from the bolt and engaging the grooves thereof, substantially as described.

2. In a nut lock, the combination of a bolt provided at the outer end of its threaded portion with ratchet grooves, a nut provided at its interior with a groove and having a branch thereof at its inner face, a coiled spring encircling the bolt and having its inner portion closely hugging the same and provided with a stem arranged in the grooves of the nut and being substantially L-shaped, the outer portion of the coiled spring being slightly offset from the bolt and provided with an integral handle portion, and a projection to engage the grooves of the bolt, substantially as described.

In testimony that I claim the foregoing as my own I have hereto affixed my signature in the presence of two witnesses.

ALEXANDER ASBURY JOHNSON.

Witnesses:
A. F. TILLEY,
M. A. STRATTON.